(12) United States Patent
Frydman et al.

(10) Patent No.: US 8,182,771 B2
(45) Date of Patent: May 22, 2012

(54) METHOD AND APPARATUS FOR SUBSTITUTE NATURAL GAS GENERATION

(75) Inventors: Arnaldo Frydman, Houston, TX (US); Ke Liu, Rancho Santa Margarita, CA (US)

(73) Assignee: General Electric Company, Schenectady, NY (US)

( * ) Notice: Subject to any disclaimer, the term of this patent is extended or adjusted under 35 U.S.C. 154(b) by 266 days.

(21) Appl. No.: 12/428,416

(22) Filed: Apr. 22, 2009

(65) Prior Publication Data
US 2010/0272619 A1 Oct. 28, 2010

(51) Int. Cl.
*B01J 8/00* (2006.01)
(52) U.S. Cl. ...... 422/600; 518/702; 48/127.9; 48/197 R; 48/198.6; 48/202; 48/210
(58) Field of Classification Search ........... 422/189, 422/600; 48/197 R, 127.9, 61, 198.6, 210, 48/202; 518/702
See application file for complete search history.

(56) References Cited

U.S. PATENT DOCUMENTS

| | | | |
|---|---|---|---|
| 3,194,644 A * | 7/1965 | Gorin et al. ............... | 48/197 R |
| 3,705,009 A * | 12/1972 | Dougherty ............... | 423/361 |
| 3,728,093 A * | 4/1973 | Cofield ................... | 48/190 |
| 3,890,113 A * | 6/1975 | Child et al. ............... | 48/197 R |
| 3,904,386 A * | 9/1975 | Graboski et al. ......... | 48/197 R |
| 3,938,968 A * | 2/1976 | White et al. .............. | 48/215 |
| 3,993,457 A * | 11/1976 | Cahn et al. ............... | 48/197 R |
| 4,181,504 A * | 1/1980 | Camacho ................. | 48/197 R |
| 4,260,553 A * | 4/1981 | Happel et al. ............ | 518/714 |
| 4,383,837 A * | 5/1983 | Smith ..................... | 48/197 R |
| 4,451,580 A * | 5/1984 | Butler et al. ............. | 502/335 |
| 4,540,681 A * | 9/1985 | Kustes et al. ............ | 502/234 |
| 6,497,856 B1 * | 12/2002 | Lomax et al. ............. | 423/651 |
| 6,955,042 B1 | 10/2005 | Wnuck et al. | |
| 6,964,156 B2 | 11/2005 | Liu et al. | |
| 7,090,043 B2 | 8/2006 | Liu et al. | |
| 2004/0177554 A1 * | 9/2004 | Yu et al. .................. | 48/110 |
| 2004/0187386 A1 * | 9/2004 | Wangerow et al. ...... | 48/198.3 |
| 2005/0143862 A1 * | 6/2005 | Sun et al. ................ | 700/268 |
| 2006/0051261 A1 * | 3/2006 | Rong et al. .............. | 422/198 |
| 2006/0137246 A1 * | 6/2006 | Kumar et al. ............. | 48/61 |
| 2006/0219403 A1 * | 10/2006 | Steinberg ................ | 166/261 |
| 2007/0072949 A1 * | 3/2007 | Ruud et al. .............. | 518/702 |
| 2007/0130832 A1 | 6/2007 | Liu et al. | |
| 2007/0212295 A1 * | 9/2007 | Woods et al. ............ | 423/656 |
| 2007/0283812 A1 | 12/2007 | Liu et al. | |
| 2008/0047259 A1 | 2/2008 | Frydman et al. | |
| 2008/0112867 A1 | 5/2008 | Wei et al. | |
| 2008/0155984 A1 | 7/2008 | Liu et al. | |
| 2009/0095155 A1 | 4/2009 | Frydman et al. | |
| 2009/0173080 A1 | 7/2009 | Wallace et al. | |
| 2009/0173081 A1 | 7/2009 | Wallace et al. | |
| 2011/0229382 A1 | 9/2011 | Frydman et al. | |
| 2011/0286894 A1 | 11/2011 | Frydman et al. | |

OTHER PUBLICATIONS

U.S. Appl. No. 12/907,932, filed Oct. 19, 2010, Pradeep S. Stanley Thacker.

* cited by examiner

*Primary Examiner* — Walter D Griffin
*Assistant Examiner* — Huy-Tram Nguyen
(74) *Attorney, Agent, or Firm* — Fletcher Yoder P.C.

(57) ABSTRACT

A system comprising a multi-stage reactor. The multi-stage reactor may include a water gas shift (WGS) reactor and a sour methanation reactor configured to generate methane without prior removal of acid gas. Furthermore, the multi-stage reactor may be a single unit having both the WGS reactor and the methanation reactor.

20 Claims, 7 Drawing Sheets

METHOD AND APPARATUS FOR SUBSTITUTE NATURAL GAS GENERATION

BACKGROUND OF THE INVENTION

The subject matter disclosed herein relates to generation of substitute natural gas.

In general, integrated gasification combined cycle (IGCC) power plants are capable of generating energy from various hydrocarbon feedstock, such as coal, relatively cleanly and efficiently. IGCC technology may convert the hydrocarbon feedstock into a gas mixture of carbon monoxide (CO) and hydrogen ($H_2$), i.e., syngas, by reaction with oxygen and steam in a gasifier. These gases may be cleaned, processed, and utilized as fuel in a conventional combined cycle power plant. For example, the syngas may be fed into a combustor of a gas turbine of the IGCC power plant and ignited to power the gas turbine for use in the generation of electricity.

However, the syngas may be further converted into substitute natural gas (SNG) which may be fed into the combustor of a gas turbine of a new or an existing (retrofit) natural gas combined cycle (NGCC) power plant and ignited to power the gas turbine for use in the generation of electricity, as well as a for general sale of produced SNG. The generation of SNG from syngas may be a complex undertaking with a multitude of steps and conversion units that may be costly to independently build and/or maintain.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a substitute natural gas (SNG) production system, comprising a multi-stage reactor comprising a water gas shift (WGS) reactor, a methanation reactor, a gas flow path through both the WGS reactor and the methanation reactor, and a single unit having both the WGS reactor and the methanation reactor.

In a second embodiment, a system includes a multi-stage reactor, comprising a water gas shift (WGS) reactor, an acid gas removal (AGR) system configured to remove hydrogen sulfide from syngas after a WGS reaction in the WGS reactor, a sweet methanation reactor configured to generate methane from the syngas after removal of acid gas by the AGR system, and a single unit having the WGS reactor, the AGR system, and the methanation reactor.

In a third embodiment, a system, includes a multi-stage reactor, comprising a water gas shift (WGS) reactor, a sour methanation reactor configured to generate methane without prior removal of acid gas, and a single unit having both the WGS reactor and the methanation reactor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed a production system and methods for generating substitute natural gas (SNG) from syngas. SNG may be a gas containing primary methane that may be produced from fuel sources such as coal or biomass. The production system for the generation of the SNG may include a composite water-gas shift (WGS)-methanation reactor that incorporates both a WGS reactor and a methanation reactor into a single unit. In other words, the WGS reactor and the methanation reactor may be fully integrated together rather than using separate units. The WGS-methanation reactor may operate with either a sweet WGS or a sour WGS configuration, that is, where sulfur has been removed from the syngas prior to a WGS reaction in which carbon monoxide reacts with water, (e.g. steam), to form carbon dioxide and hydrogen, or where sulfur is present in syngas during the WGS reaction. Similarly, the methanation reactor may operate with either a sweet or a sour configuration, that is, where sulfur has been removed from the syngas prior to it being converted into an SNG rich gas, or where sulfur is present in the syngas as it is converted into an SNG rich gas. In this manner, the WGS-methanation reactor may operate utilizing raw syngas (syngas containing sulfur) or clean syngas (syngas without sulfur). Additionally, an acid gas removal system may be utilized in conjunction with a WGS-methanation reactor that incorporates a sour WGS reactor and a sweet methanation reactor.

Figure 1:
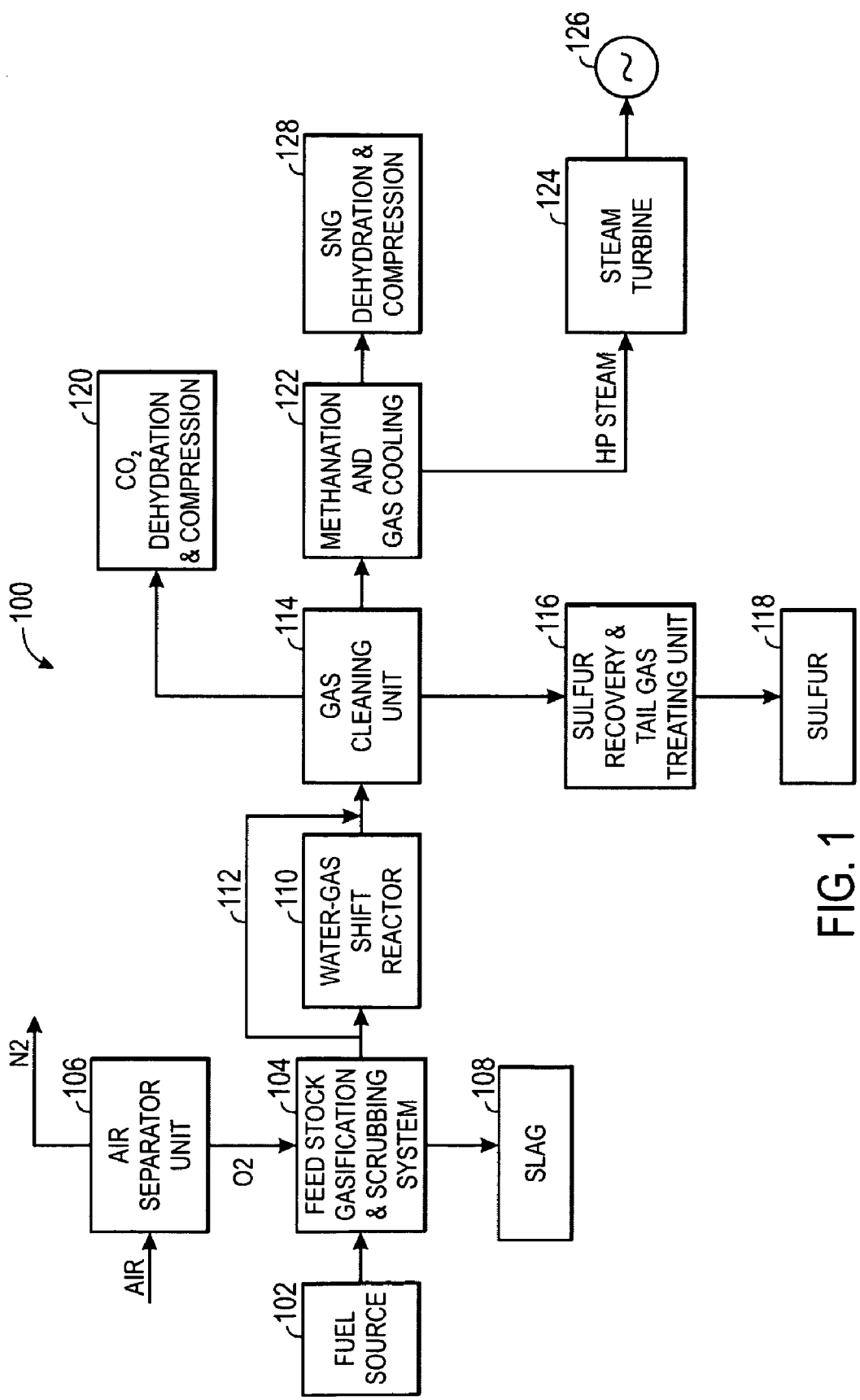
FIG. 1 a schematic block diagram of an embodiment of a substitute natural gas (SNG) production system.

FIG. 1 illustrates, for context, a substitute natural gas (SNG) production system 100. Elements of the IGCC system 100 may include a fuel source 102, such as a solid feed, that may be utilized as a source of energy for the production of SNG. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock, gasification, and scrubbing system 104. The feedstock, gasification, and scrubbing system 104 may include several subsystems. For example, the feedstock, gasification, and scrubbing system 104 may include a feedstock preparation subsystem that may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation subsystem to create slurry feedstock. In other embodiments, no liquid is added to the fuel source in the feedstock preparation subsystem, thus yielding dry feedstock.

The feedstock may be passed to a gasification subsystem of the feedstock, gasification, and scrubbing system 104 from the from the feedstock preparation subsystem. The gasification subsystem may convert the feedstock into a combination of carbon monoxide and hydrogen, e.g., syngas. This conversion may be accomplished by subjecting the feedstock to a controlled amount of steam and oxygen at elevated pressures, e.g., from approximately 20 bar to 85 bar, and temperatures, e.g., approximately 700 degrees Celsius-1600 degrees Celsius, depending on the type of gasifier utilized in the gasification subsystem. The gasification process may also include the feedstock undergoing a pyrolysis process, whereby the feedstock is heated. Temperatures inside the gasifier of the gasification subsystem may range from approximately 150 degrees Celsius to 700 degrees Celsius during the pyrolysis process, depending on the fuel source 102 utilized to generate the feedstock. The heating of the feedstock during the pyrolysis process may generate a solid, e.g., char, and residue gases, e.g., carbon monoxide, hydrogen, and nitrogen. The char remaining from the feedstock from the pyrolysis process may only weigh up to approximately 30% of the weight of the original feedstock.

A combustion process may then occur in the gasification subsystem. To aid with this combustion process, oxygen may be supplied to the gasification subsystem from an air separation unit (ASU) 106. The ASU 106 may operate to separate air into component gases by, for example, distillation techniques that may be cryogenic or may utilize pressure swing adsorption (PSA). The ASU 106 may separate oxygen from the air supplied to it and may transfer the separated oxygen to the gasification subsystem. Additionally the ASU 106 may separate nitrogen, for example, for collection or for further use in power generation.

Accordingly, the oxygen is received by the gasification subsystem from the ASU 106 for combustion purposes. The combustion may include introducing oxygen to the char and residue gases so that the char and residue gases may react with the oxygen to form carbon dioxide and carbon monoxide, thus providing heat for the subsequent gasification reactions. The temperatures during the combustion process may range from approximately 700 degrees Celsius to 1600 degrees Celsius. Next, steam may be introduced into the gasification subsystem during a gasification step. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be combusted to produce carbon dioxide and energy, thus driving a main reaction that converts further feedstock to hydrogen and additional carbon monoxide.

In this way, a resultant gas is manufactured by the gasifier gasification subsystem. This resultant gas may include approximately 85% of carbon monoxide and hydrogen, as well as $CH_4$, HCl, HF, $NH_3$, HCN, COS and $H_2S$ (based on the sulfur content of the feedstock). This resultant gas may be termed raw syngas. The gasification subsystem may also generate waste, such as slag 108, which may be a wet ash material.

This slag 108 may be removed from the gasification subsystem by a scrubbing subsystem of the feedstock, gasification, and scrubbing system 104. The slag 108 may be disposed of, for example, as road base, or as another building material. Additionally, the scrubbing subsystem may clean the raw syngas by removing any particulate matter from the raw syngas, such as the wet ash.

The raw syngas may then be passed to a WGS reactor 110. The WGS reactor 110 may perform a WGS reaction in which carbon monoxide reacts with water, (e.g. steam), to form carbon dioxide and hydrogen. This process may adjust the ratio of hydrogen to carbon monoxide in the raw syngas from approximately 1 to 1 to approximately 3 to 1 for the methanation process. Additionally, the WGS reactor 110 may include a bypass 112 that may be utilized to aid in proper control of the hydrogen to carbon monoxide ratio of the raw shifted syngas. It should be noted that the WGS reactor 110 may be a sour WGS reactor, that is, sulfur may be present in the raw syngas fed into the WGS reactor 110 during the WGS reaction.

Subsequent to the WGS reaction in the WGS reactor 110, the system 100 may transmit the raw shifted syngas to a gas cleaning unit 114. The gas cleaning unit 114 may scrub the raw shifted syngas, (e.g., syngas product of the WGS reactor 110 and containing sulfur), to remove unwanted elements, for example, the HCl, HF, COS, HCN, and $H_2S$ from the raw syngas, to generate clean syngas, (e.g., syngas without sulfur). Additionally, the gas cleaning unit may transmit the unwanted elements of the raw syngas, (e.g., the HCl, HF, COS, HCN, and $H_2S$) to the sulfur recovery and tail gas treating unit 116, which may include separation of sulfur 118 by, for example, an acid gas removal process in the sulfur recovery and tail gas treating unit 116. In this manner, the sulfur 118 may be isolated for disposal or for sale.

At this point, the clean syngas may include approximately 3% CO, approximately 55% $H_2$, and approximately 40% $CO_2$ and is substantially stripped of $H_2S$. In this manner, the methanation and gas cooling unit 122 may operate utilizing raw syngas (syngas containing sulfur) or clean syngas (syngas without sulfur). The gas cleaning unit 114 may further include a $CO_2$ removal subsystem that may strip the $CO_2$ from the clean syngas. The stripped $CO_2$ may be transmitted from the gas cleaning unit 114 to the $CO_2$ dehydration and compression unit 120 that may dehydrate and compress the $CO_2$ for storage and subsequent use, for instance this $CO_2$ may be sent through a pipeline leading to a carbon sequestration site, such as enhanced-oil recovery (EOR) sites or saline aquifers. Alternatively, the $CO_2$ dehydration and compression unit 120 may transmit the dehydrated and compressed $CO_2$ to, for example, a chemical plant for use therein.

The gas cleaning unit 114 may transmit the syngas to a methanation and gas cooling unit 122. The methanation and gas cooling unit 122 may convert the CO and the $H_2$ in the syngas into $CH_4$ and $H_2O$, that is, into methane, (e.g., SNG), and water as an exothermic reaction. Accordingly, the methanation and gas cooling unit 122 may include one or more heat exchangers that utilize a coolant (e.g., water) to cool the resultant SNG and water. This may generate steam, which the methanation and gas cooling unit 122 transmits to a steam turbine 124 for generation of power 126. The power 126 may be used by, for example, various manufacturing plants or may be transmitted to a power grid for subsequent use. It should be noted that the methanation and gas cooling unit 122 may include a sweet methanation reactor that utilizes clean syngas, (e.g., sulfur has been removed from the syngas), prior to the syngas being converted into SNG and water.

The methanation and gas cooling unit 122 may transmit the generated SNG and water to a SNG dehydration and compression unit 128. This SNG dehydration and compression unit 128 may separate the water from the SNG, so that the SNG may be compressed and transmitted from the SNG dehydration and compression unit 128 to, for example, an SNG pipeline. The SNG pipeline may be used to transmit the SNG to, for example, storage facilities or additional SNG treatment facilities.

Figure 2:
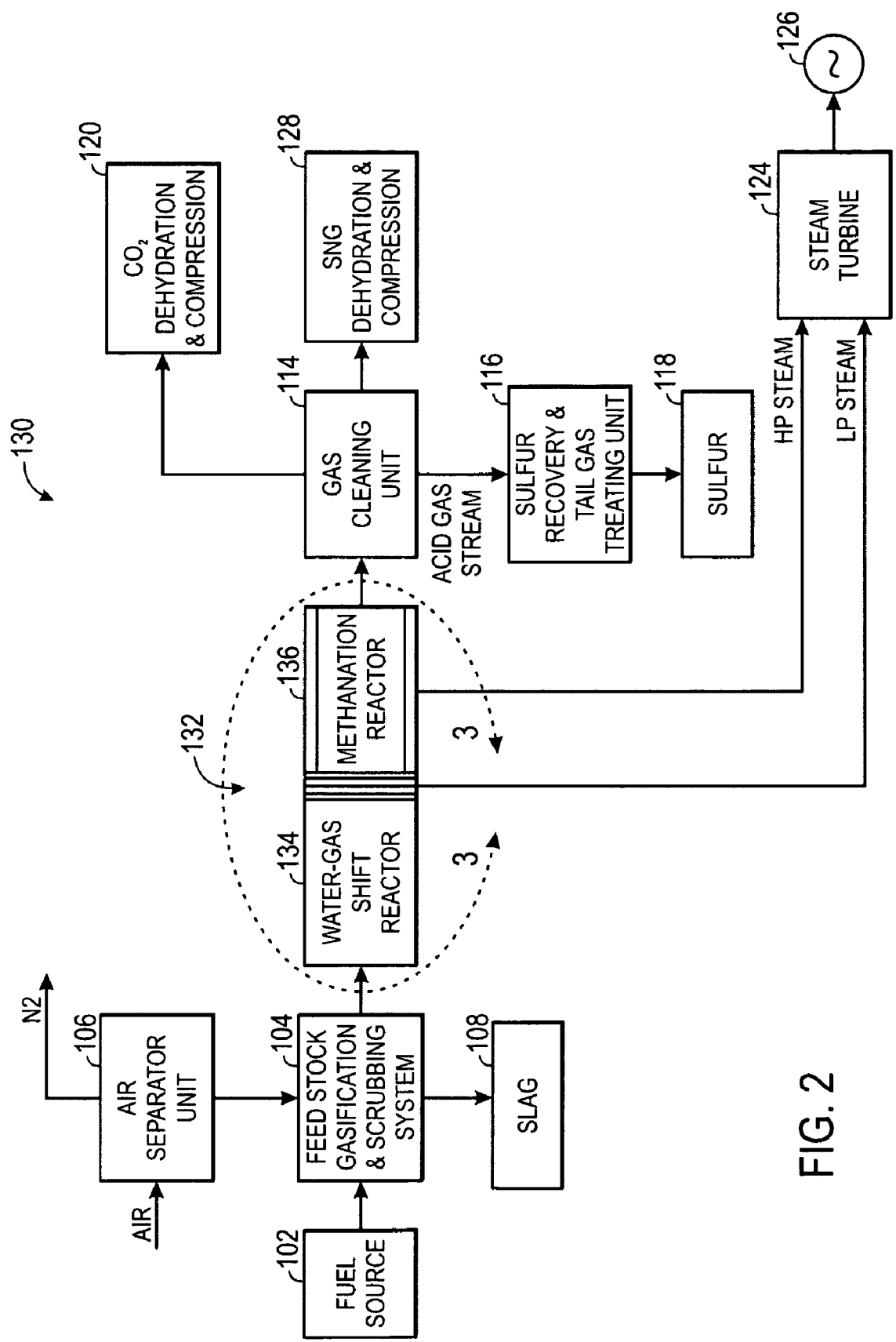
FIG. 2 is a schematic block diagram of another embodiment of a substitute natural gas (SNG) production system.

FIG. 2 illustrates another embodiment of a SNG production system 130. The SNG production system 130 may include a fuel source 102, a feedstock, gasification, and scrubbing system 104, an ASU 106, a gas cleaning unit 114, a sulfur recovery and tail gas treating unit 116, a $CO_2$ dehydration and compression unit 120, a steam turbine 124, and a SNG dehydration and compression unit 128. Each of these elements may operate in a substantially similar manner to that described above with respect to FIG. 1. Furthermore, the SNG production system 132 may include a WGS-methanation reactor 132. The WGS-methanation reactor 132 may combine a WGS reactor 134 with a methanation reactor 136 in a single unit. In other words, the WGS reactor 134 and the methanation reactor 136 may be fully integrated together as the reactor 132 rather than using separate units. The WGS reactor 134 may perform a WGS reaction in which carbon monoxide reacts with water, (e.g. steam), to form carbon dioxide and hydrogen, which may be performed to adjust the ratio of hydrogen to carbon monoxide in the raw syngas from approximately 1 to 1 to approximately 3 to 1, for proper methanation to occur. The methanation reactor 136 may perform a methanation process that may convert the CO and the $H_2$ in the syngas into $CH_4$ and $H_2O$, that is, into methane, (e.g., SNG), and water and the methanation reactor 132 may be a sour methanation reactor, that is, the methanation reactor 132 may generate methane without prior removal of acid gas, (e.g. $H_2S$). This combined WGS-methanation reactor 132 may reduce the overall cost and complexity of the SNG production system 130. Furthermore, it should be noted that the single reactor 132 excludes an acid gas removal system, (e.g., the gas cleaning unit 114 and the sulfur recovery and tail gas treating unit 116), in the gas flow path between the WGS reactor 134 and the methanation reactor 136. Instead the acid gas removal system is downstream of the gas flow path of the multi-stage reactor 132.

Figure 3:
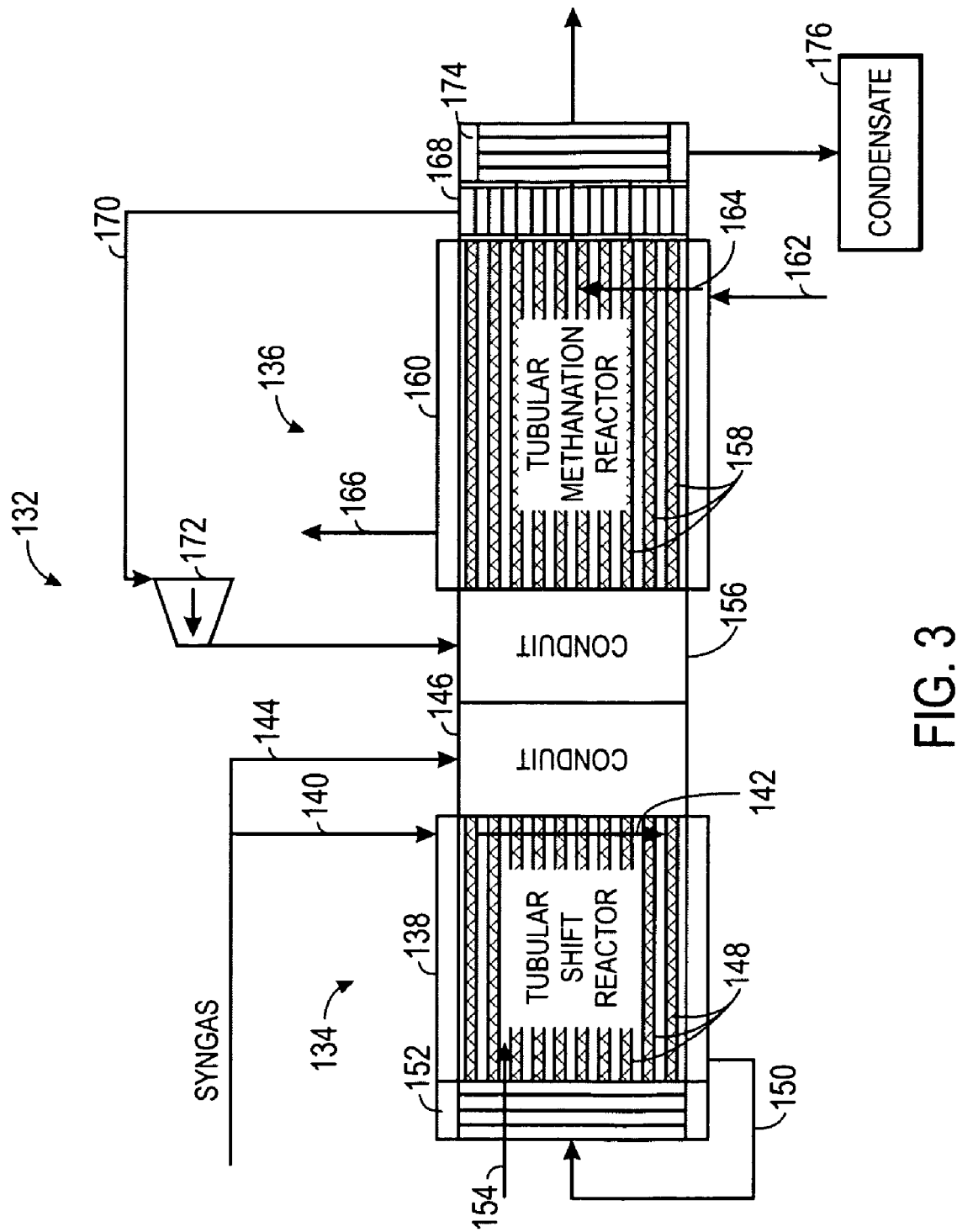
FIG. 3 is a schematic block diagram of a WGS-methanation reactor of FIG. 2 as shown within line 3-3 of FIG. 2.

FIG. 3 illustrates an embodiment of the water-gas methanation reactor 132 as shown within line 3-3 of FIG. 2. Syngas may flow to a tubular WGS reactor 138 via a conduit 140 in a generally downward direction, as indicated by arrow 142. While flowing through the conduit 140, steam may optionally be added to the syngas, e.g., based on the type of catalyst utilized in the tubular shift reactor 138. This catalyst may be, for example, based on sulfided Co—Mo, or based on any other known sour WGS catalyst. Additionally, some of the syngas may optionally bypass the tubular shift reactor 138 via a second conduit 144, e.g., to be injected into conduit 146. This bypassing of some syngas may aid in proper control of the hydrogen to carbon monoxide ratio of the shifted syngas exiting the tubular shift reactor 138. As the syngas flows through the tubular shift reactor 138, as indicated by the arrow 142, it may contact the exterior of tubes 148. These tubes 148 may be filled-in and/or wash-coated with a WGS catalyst that may accelerate the WGS reaction to be performed in the tubular shift reactor 138 of the WGS reactor 134. Washcoating is a technique for catalyst preparation in which the substrate, here the surface of the tubes of the tubular shift reactor 138, is immersed into a solution or a slurry that contains the catalytic elements dissolved or in suspension. After proper heating and drying treatments, the substrate becomes coated with the catalytic elements similarly to a paint on the surface of the substrate.

The WGS reaction is an exothermic reaction, and accordingly, heat may radiate from the tubes 148 and may contact and heat the syngas as it passes through the tubular shift reactor 138. Heating of the syngas in this manner may aid in the overall efficiency of the WGS reactor 134 because the WGS catalyst utilized in accelerating the WGS reaction may react with heated syngas more quickly than with cold syngas.

The heated syngas may be transmitted, via conduit 150 into a distribution plate 152 generally in the direction illustrated by arrow 154. The distribution plate 152 may, for example, be a heat exchanger that may operate to disperse the syngas evenly throughout the tubular shift reactor 138. Accordingly, the evenly dispersed syngas flows from the distribution plate 152 into an interior of, and through, the tubes 148 of the tubular shift reactor 138 generally in the direction of arrow 154. The inner walls of the tubes 148 may be wash-coated with the WGS catalyst and/or the WGS catalyst may fill the tubes 148. As the syngas passes through the tubes 148, the WGS catalyst may accelerate the reaction of the carbon monoxide in the syngas with water in the syngas to form carbon dioxide and hydrogen. This process may be performed to adjust the ratio of hydrogen to carbon monoxide in the raw syngas from approximately 1 to 1 to approximately 3 to 1.

The shifted syngas may exit the tubular shift reactor 138, generally in the direction of arrow 154, and may enter the conduit 146. In conduit 146, the bypassed syngas may mix with the shifted syngas and the mixture may enter the conduit 156. The conduit 156 may be a heat exchanger that may cool the mixed syngas with a coolant, for example, water. Cooling of the syngas may cause the water to boil, producing, for example, low pressure steam. This steam, for example, may be transmitted to the steam turbine 124. The conduit 156 may also be, for example, a distributor, which distributes the syngas mixture into an interior of, and through, tubes 158 of a tubular methanation reactor 160 in the methanation reactor 136.

The inner portion of the walls of the tubes 158 of the tubular methanation reactor 160 may also be wash-coated and/or the tubes 158 may be filled-in with a sour methanation catalyst, that may be contain components present in known sour WGS catalysts and/or may also contain components present in hydrodesulfurization (HDS) catalysts, in addition to methanation catalysts elements such as NiO, and compositions including Co, Mg, and Ni, or any other known methanation catalysts. This methanation catalyst may accelerate the reaction of the CO and the $H_2$ in the syngas into $CH_4$ and $H_2O$, that is, into methane, (e.g., SNG), and water as a SNG rich gas. Methanation is extremely exothermic, producing approximately five times as much heat as is produced in the WGS reactor 134, on a per mol of fed carbon monoxide basis. Accordingly, water (and/or low temperature steam) may be passed through conduit 162, generally in the direction indicated by arrow 164, to remove the heat of reaction and cool the tubes 158 (e.g., about the exterior of the tubes 158) so that they are not over-heated and be damaged during the methanation reaction. The water (and/or steam) transmitted through the tubular methanation reactor 160 may vaporize, creating, for example, high pressure steam for transmission to the steam turbine 124 via conduit 166. Alternatively, the steam may be used to drive the WGS reaction.

After the methanation reaction has occurred, the SNG rich gas may exit the tubular methanation reactor 160 into recycler 168. Recycler 168 may pass some portion, for example approximately 5%, 10%, 15%, 20%, 25%, 30%, 35%, 40%, 45%, 50%, 55%, 60%, 65%, 70%, 75%, 80%, 85%, or 90% by volume or between approximately 5%-90% by volume of the SNG rich gas through conduit 170 to conduit 156 via recycle compressor 172. This transfer of SNG rich gas may operate to recycle the SNG rich gas through the tubular methanation reactor 160 to control the heat generated during the methanation process. In this manner, one may control the temperature of methanation reactor 160 so it may be between approximately 650 degrees Celsius and 700 degrees Celsius. For example, if 10% of the SNG rich gas by volume is injected into the tubes 158 of the tubular methanation reactor 160, by means of conduit 156, the methanation product components present in that 10% portion of SNG rich gas, that is, $CH_4$ and $H_2O$ will not react, thus becoming factors of dilution for the methanation reaction media and thereby preventing the methanation process from overheating the methanation catalyst, the methanation reactor 160, and its tubes 158. Furthermore, recycle compressor 172 may aid in increasing the pressure of the SNG rich gas in the conduit 170 to a level approximately equal to the pressure of the syngas in the conduit 156, since the methanation catalyst may introduce a drop in pressure of the gas flowing through the tubes 158.

Finally, the WGS-methanation reactor 132 may include a condenser 174 that may remove water from the SNG rich gas as condensate 176. In certain embodiments, the condenser 174 may be a heat exchanger that may cool the SNG rich gas. The SNG rich gas may flow through the condenser 174 generally in a direction indicated by arrow 154, and may exit the WGS-methanation reactor 132 to be sent to the gas cleaning unit 114 of FIG. 2. As such, it should be noted that the WGS-methanation reactor 132 may utilize sour WGS and sour methanation, that is, sulfur 118 is in the syngas that is converted into a SNG rich gas in the WGS-methanation reactor 132. Accordingly, this sulfur 118 may be separated from the SNG via the gas cleaning unit 114 and removed via the sulfur recovery and tail gas treating unit 116. This may allow for less rigorous purification of the syngas prior to conversion into SNG because the sour WGS and sour methanation processes may be performed with raw syngas.

Figure 4:
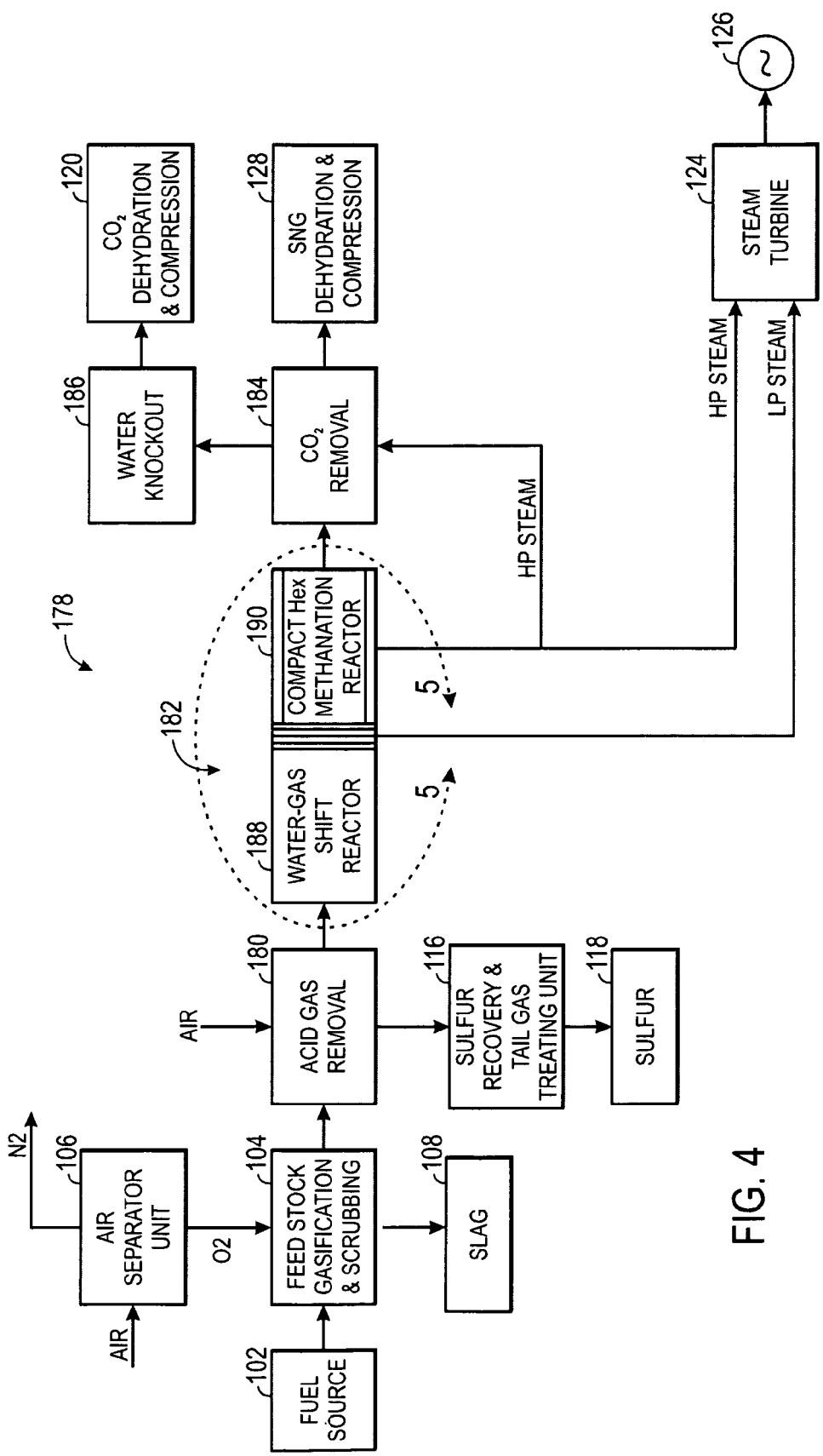
FIG. 4 is a schematic block diagram of another embodiment of a substitute natural gas (SNG) production system.

FIG. 4 illustrates another embodiment of a SNG production system 178. The SNG production system 178 may include a fuel source 102, a feedstock, gasification, and scrubbing system 104, an ASU 106, a sulfur recovery and tail gas treating unit 116, a $CO_2$ dehydration and compression unit 120, a steam turbine 124, and a SNG dehydration and compression unit 128. Each of these elements may operate in a substantially similar manner to that described above with respect to FIG. 1. Furthermore, the SNG production system 178 may include an acid gas removal unit 180, a WGS-methanation reactor 182, a $CO_2$ removal unit 184, and a water knockout unit 186. As illustrated, the acid gas removal system, (e.g., the gas cleaning unit 114 and the sulfur recovery and tail gas treating unit 116), is upstream of the gas flow path of the multi-stage reactor 182, while the carbon dioxide removal unit 184 is excluded from the gas flow path between the WGS reactor 188 and the methanation reactor 190, and instead is positioned downstream of the gas flow path of the multi-stage reactor 182.

The acid gas removal unit 180 may utilize a thermal swing process to separate acid gas, (e.g., hydrogen sulfide [$H_2S$] in the syngas), from the syngas. The thermal swing process may, for example, include an adsorption step whereby the adsorption of $H_2S$ is carried out followed by thermal regeneration step using a air or oxygen enriched air. This thermal swing process (also known as warm gas cleanup) may include mixing the syngas with fluidized media, such as Zinc Oxide (ZnO) to generate Zinc Sulfide (ZnS) in the adsorption step. In the regeneration step, that Zinc Sulfide may be mixed under heat with Oxygen ($O_2$) to generate Sulfur dioxide ($SO_2$), which may be transmitted to the sulfur recovery and tail gas treating unit 166 for removal and disposal or sale of the sulfur 118.

The WGS-methanation reactor 182 may combine a WGS reactor 188 with a methanation reactor 190 in a single unit. Again, the WGS reactor 188 and the methanation reactor 190 may be fully integrated together as the reactor 182 rather than using separate units. The water gas shift reactor 188 may perform a WGS reaction in which carbon monoxide reacts with water, (e.g. steam), to form carbon dioxide and hydrogen, which may be performed to adjust the ratio of hydrogen to carbon monoxide in the raw syngas from approximately 1 to 1 to approximately 3 to 1, for proper methanation. The methanation reactor 190 may perform a methanation process that may convert the CO and the $H_2$ in the syngas into $CH_4$ and $H_2O$, that is, into methane, (e.g., SNG), and water. This combined WGS-methanation reactor 182 may reduce the overall cost and complexity of the SNG production system 178.

The output of the WGS-methanation reactor 182 is a SNG rich gas that is transmitted to the $CO_2$ removal unit 184. The $CO_2$ removal unit 184 may utilize a thermal swing process to separate the carbon dioxide ($CO_2$) from the SNG in the SNG rich gas. For example, a sorbent, such as Calcium Oxide (CaO) may be mixed with the $CO_2$ of the SNG rich gas to generate Calcium carbonate ($CaCO_3$), which may be transmitted to a regeneration portion of the $CO_2$ removal unit 184, while the SNG is transmitted to the SNG dehydration and compression unit 128. In the regeneration portion of the $CO_2$ removal unit 184, the calcium carbonate may be exposed to heat and elevated pressure stream as carrier, causing the calcium carbonate to decompose back into carbon dioxide and calcium oxide. This is also advantageous because the $CO_2$ stream may come off at some higher pressure, which may impact the $CO_2$ compression unit 120 positively with lower load requirement. The calcium oxide may be reused as a sorbent, as described above, while the carbon dioxide may be transmitted to the water knockout unit 186, which may be a heat exchanger or a condenser that removes water from the carbon dioxide stream and passes the carbon dioxide stream to the $CO_2$ dehydration and compression unit 120. This $CO_2$ may be sent through a pipeline leading to other chemical facilities or may be sent to a carbon sequestration site, such as enhanced-oil recovery (EOR) sites or saline aquifers.

Figure 5:
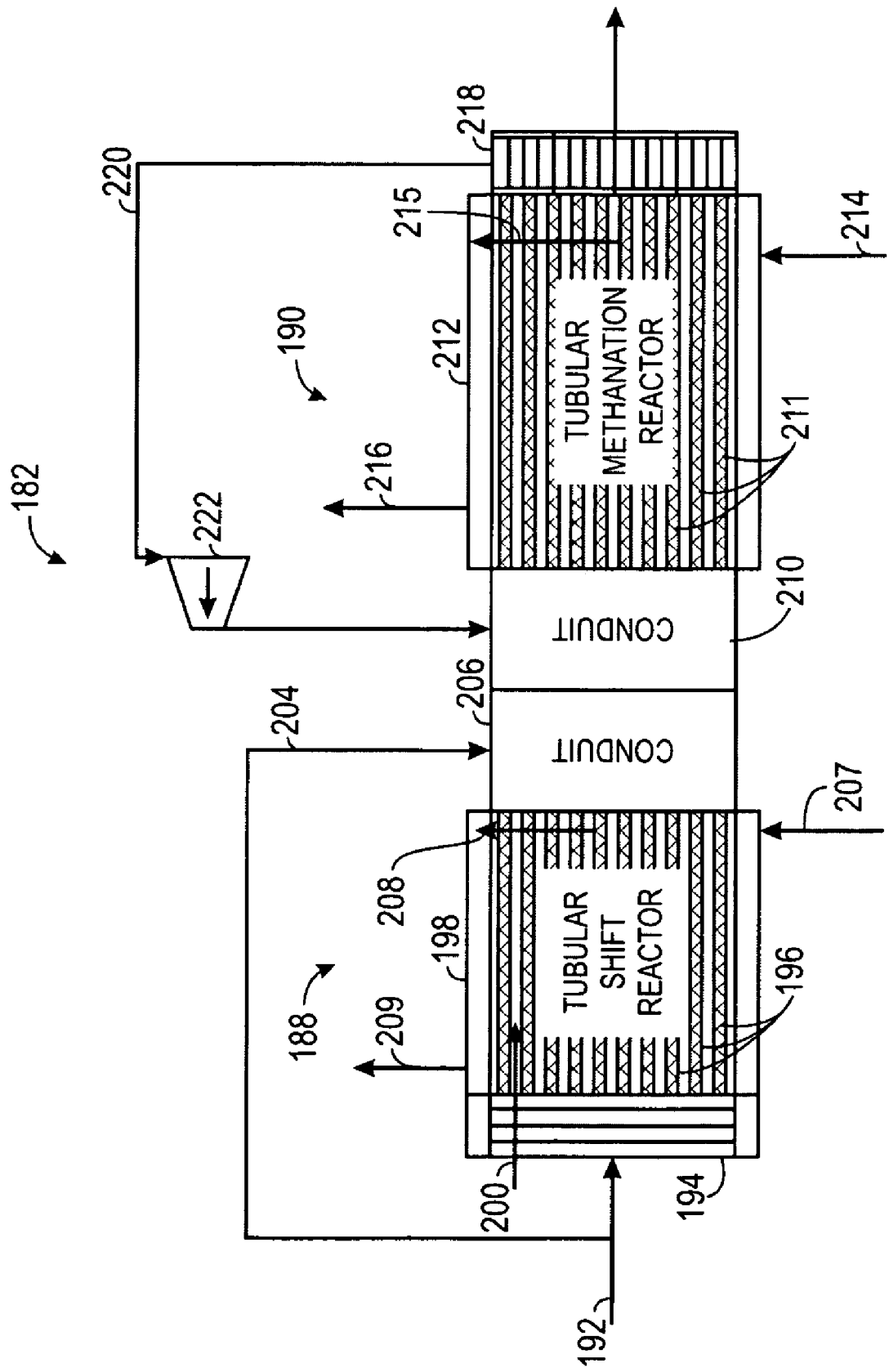
FIG. 5 is a schematic block diagram of a WGS-methanation reactor of FIG. 4 as shown within line 5-5 of FIG. 4.

FIG. 5 illustrates an embodiment of the WGS-methanation reactor 182 as shown within line 5-5 of FIG. 4. Syngas may flow, via a conduit 192 into a distribution plate 194 generally in the direction illustrated by arrow 200. The distribution plate 194 may, for example, be a heat exchanger that may operate to disperse the syngas evenly throughout the tubular shift reactor 198 of the WGS reactor 188. Accordingly, the evenly dispersed syngas flowing from the distribution plate 194 may be passed into an interior of, and through, the tubes 196 of the tubular WGS reactor 198 generally in the direction of arrow 200.

As the syngas passes through the tubes 196, the syngas may react with a WGS catalyst that has been wash-coated onto the inner portion of the walls of the tubes 196. This WGS catalyst may accelerate the reaction of the carbon monoxide in the syngas with water, (e.g. steam) in the syngas to form carbon dioxide and hydrogen. This process may be performed to adjust the ratio of hydrogen to carbon monoxide in the raw syngas from approximately 1 to 1 to approximately 3 to 1, for proper methanation. Additionally, some of the syngas may optionally bypass the tubular shift reactor 198 via a second conduit 204, e.g., to be injected into conduit 206. This bypassing of some un-shifted syngas may aid in proper control of the hydrogen to carbon monoxide ratio of the shifted syngas exiting the tubular WGS reactor 198.

As the syngas flows through the tubular WGS reactor 198, the WGS process, including the reaction of syngas with the WGS catalyst, may generate heat. That is, the WGS reaction is an exothermic reaction, and accordingly, heat may radiate from the tubes 196. To prevent overheating of the tubes 196, a cooling fluid, such as water, may be transmitted to the tubular WGS reactor 198 around the exterior of the tubes 196 via conduit 207, in a general direction illustrated by arrow 208. The cooling fluid may vaporize, causing, for example, low pressure steam to form, which may be transmitted out of the tubular WGS reactor 198 via conduit 209. This steam, for example, may be transmitted to the steam turbine 124.

The shifted syngas may exit the tubular WGS reactor 198, generally in the direction of arrow 200, and may enter the conduit 206. In conduit 206, the bypassed syngas may mix with the shifted syngas and the mixture may enter a conduit 210. The conduit 210 may be a heat exchanger that may cool the mixed syngas with a coolant, for example, water. Cooling of the syngas may cause the water to vaporize, creating, for example, low pressure steam. This steam, for example, may be transmitted to the steam turbine 124. The conduit 210 may also be, for example, a distributor, which distributes the syngas mixture into an interior of, and through, tubes 211 of a tubular methanation reactor 212 in the methanation reactor 190.

The inner portion of the walls of the tubes 211 of the tubular methanation reactor 212 may be filled-in and/or wash-coated with a methanation catalyst. This methanation catalyst may accelerate the reaction of the CO and the $H_2$ in the syngas into $CH_4$ and $H_2O$, that is, into methane, (e.g., SNG), and water as a SNG rich gas. This reaction is extremely exothermic, producing approximately five times as much heat as is produced in the WGS reactor 188, on a per mol of fed carbon monoxide basis. Accordingly, water may be passed through conduit 214, generally in the direction indicated by arrow 215, to cool the tubes 211 (e.g., coolant flow around the exterior of the tubes 211) so that they are not over-heated or damaged during the methanation reaction. The water transmitted through the tubular methanation reactor 212 may boil, creating, for example, high pressure steam for transmission to the steam turbine 124 via conduit 216.

After the methanation reaction has occurred, the SNG rich gas may exit the tubular methanation reactor 212 into recycler 218. Recycler 218 may pass some portion, for example approximately 5%, 10%, 15%, 20%, 25%, 30%, 35%, 40%, 45%, 50%, 55%, 60%, 65%, 70%, 75%, 80%, 85%, or 90% by volume or between approximately 5%-90% by volume of the SNG rich gas through conduit 220 to conduit 210 via recycle compressor 222. In this manner, one may control the temperature of methanation reactor 160 so it may be at approximately 650 degrees Celsius and no more than 700 degrees Celsius. This transfer of SNG rich gas may operate to recycle the SNG rich gas through the tubular methanation reactor 212 to control the heat generated during the methanation process. For example, if 10% of the SNG rich gas by volume is injected into the tubes 211 of the tubular methanation reactor 212, by means of conduit 210, the methanation product components present in that 10% portion of SNG rich gas, that is $CH_4$ and $H_2O$ will not react, thus becoming factors of dilution for the methanation reaction media, and thereby preventing the methanation process from overheating the methanation catalyst, the methanation reactor 212 and its tubes 211. Furthermore, recycle compressor 222 may aid in increasing the pressure of the SNG rich gas in the conduit 220 to a level approximately equal to the pressure of the syngas in the conduit 210, since the methanation catalyst may introduce a drop in pressure of the gas flowing through the tubes 211.

The SNG rich gas may flow through the recycler 218 generally in a direction indicated by arrow 200, and may exit the WGS-methanation reactor 182 to be sent to the $CO_2$ removal unit 184 of FIG. 4. As such, it should be noted that the WGS-methanation reactor 182 may utilize sweet WGS and sweet methanation, that is, sulfur 118 has been removed from the syngas prior to it being converted into a SNG rich gas in the WGS-methanation reactor 182. This may allow for a less relatively less complex tubular WGS reactor 198 and tubular methanation reactor 212 for conversion of the syngas into SNG because the WGS and methanation processes may be performed with clean syngas. The catalyst in the sweet WGS reactor 198 may utilize Cu—Zn, Fe—Cr, or any other known WGS catalyst, while the catalyst in sweet methanation reactor 212 may utilize NiO, and compositions including Co, Mg, and Ni, or any other known methanation catalysts.

Figure 6:
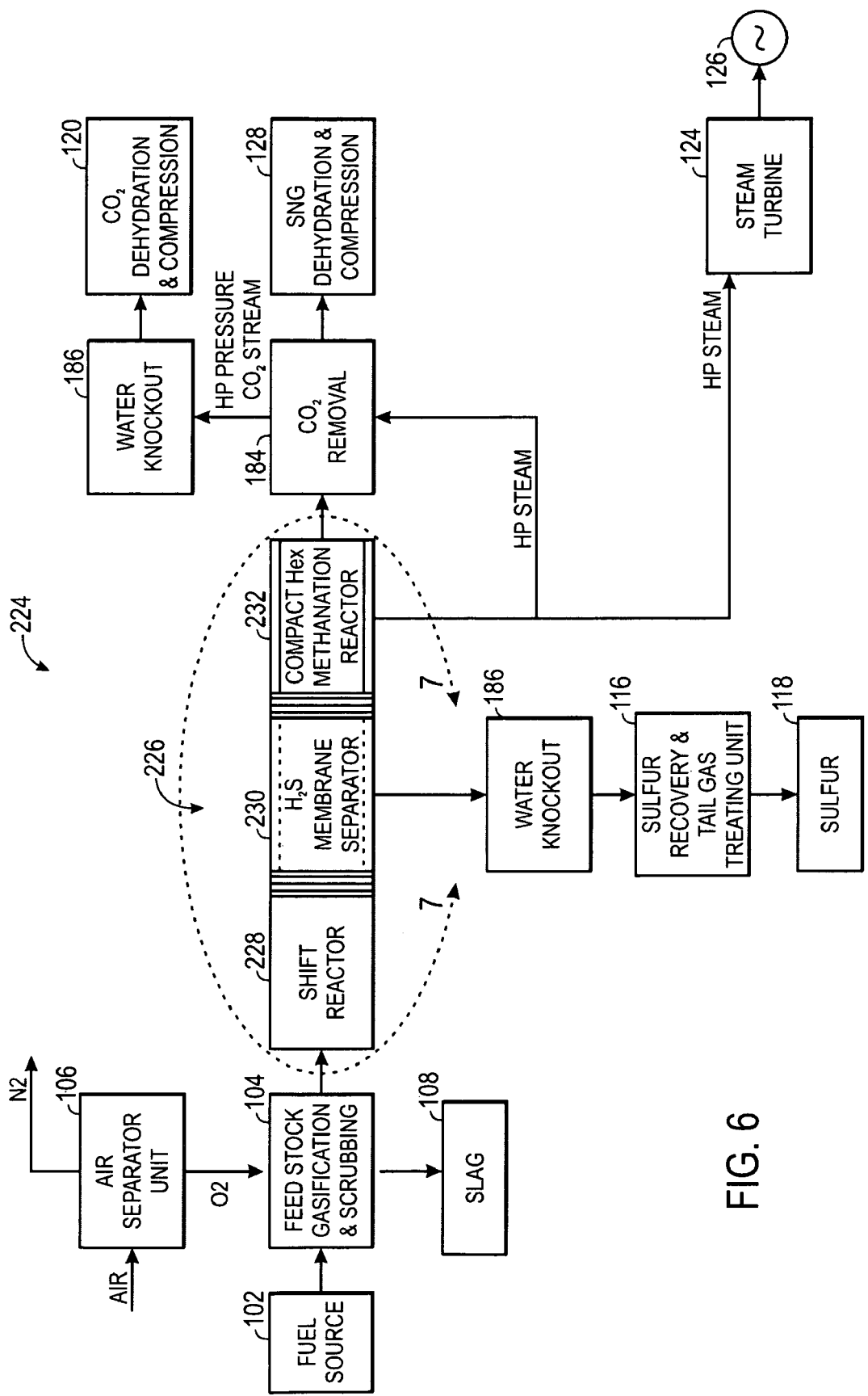
FIG. 6 is a schematic block diagram of another embodiment of a substitute natural gas (SNG) production system.

FIG. 6 illustrates another embodiment of a SNG production system 224. The SNG production system 224 may include a fuel source 102, a feedstock, gasification, and scrubbing system 104, an ASU 106, a sulfur recovery and tail gas treating unit 116, a $CO_2$ dehydration and compression unit 120, a steam turbine 124, a SNG dehydration and compression unit 128, a $CO_2$ removal unit 184, and two water knockout units 186. Each of these elements may operate in a substantially similar manner to that described above with respect to FIGS. 1 and 4.

Furthermore, the SNG production system 224 may include a WGS-methanation reactor 226 that may include a WGS reactor 228, a hydrogen sulfide ($H_2S$) membrane separator 230, and a methanation reactor 232 in a single unit. In other words, the WGS reactor 228, the membrane separator 230, and the methanation reactor 232 may be fully integrated together as the reactor 226 rather than using separate units. The WGS reactor 228 may perform a WGS reaction in which carbon monoxide reacts with water, (e.g. steam), to form carbon dioxide and hydrogen, which may be performed to adjust the ratio of hydrogen to carbon monoxide in the raw syngas from approximately 1 to 1 to approximately 2 to 1, 3 to 1, or 4 to 1. The $H_2S$ membrane separator 230 may operate to separate any $H_2S$ from the syngas before methanation, as described below with respect to FIG. 7, in conjunction with an acid gas removal system, (e.g., the sulfur recovery and tail gas treating unit 116), after a WGS reaction by reactor 228.

The methanation reactor 232 may perform a methanation process that may convert the CO and the $H_2$ in the syngas into $CH_4$ and $H_2O$, that is, into methane, (e.g., SNG), and water. The methanation reactor 232 may be a sweet methanation reactor, since it is configured to generate methane after removal of acid gas by the $H_2S$ membrane separator 230 and the sulfur recovery and tail gas treating unit 116. This combined WGS-methanation reactor 226 may reduce the overall cost and complexity of the SNG production system 224. Furthermore, through the use of a $H_2S$ membrane separator 230 between the WGS reactor 228 and the methanation reactor 232. The operation of the WGS-methanation reactor 226 may operate utilizing a sour WGS sweet methanation process, (e.g., sulfur present in the syngas during the WGS process and not present in the syngas during the methanation process), described below with respect to FIG. 7.

Figure 7:
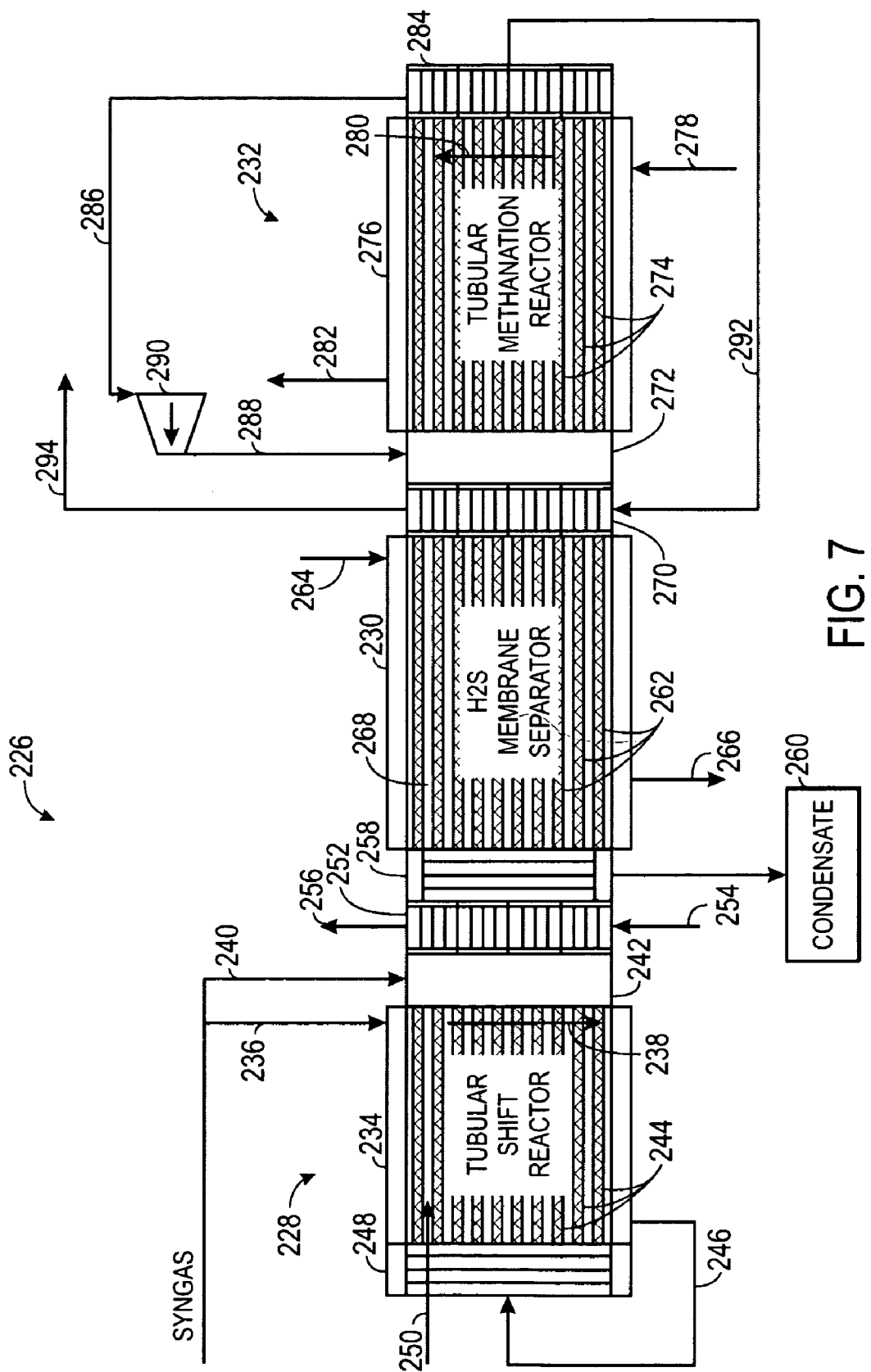
FIG. 7 is a schematic block diagram of a WGS-methanation reactor of FIG. 6 as shown within line 7-7 of FIG. 6.

FIG. 7 illustrates an embodiment of the WGS-methanation reactor 226 as shown within line 7-7 of FIG. 6. Syngas may flow to a tubular shift reactor 234 via a conduit 236 in a generally downward direction, as indicated by arrow 238. While flowing through the conduit 236, steam may optionally be added to the syngas, e.g., based on the type of WGS catalyst utilized in the tubular WGS reactor 234. Additionally, some of the shifted syngas may optionally bypass the tubular WGS reactor 234 via a second conduit 240, e.g., to be injected into conduit 242. This bypassing of some un-shifted syngas may aid in proper control of the hydrogen to carbon monoxide ratio of the shifted syngas exiting the tubular WGS reactor 234.

As the syngas flows through the tubular WGS reactor 234, as indicated by the arrow 238, it may contact the exterior of tubes 244. These tubes 244 may be wash-coated with a WGS catalyst that may accelerate the WGS reaction to be performed in the tubular shift reactor 234 of the WGS reactor 228. The WGS reaction is an exothermic reaction, and accordingly, heat may radiate from the tubes 244 and may contact and heat the syngas as it passes through the tubular WGS reactor 234. Heating of the syngas in this manner may aid in the overall efficiency of the WGS reactor 228 because the WGS catalyst utilized in accelerating the WGS reaction may react with heated syngas more quickly than with cold syngas.

The heated syngas may be transmitted, via conduit 246 into a distribution plate 248 generally in the direction illustrated by arrow 250. The distribution plate 248 may, for example, be a heat exchanger that may operate to disperse the syngas evenly throughout the tubular WGS reactor 234. Accordingly, the evenly dispersed syngas flows from the distribution plate 248 into an interior of, and through, the tubes 244 of the tubular shift reactor 234 generally in the direction of arrow 250. As the syngas passes through the tubes 244, it may react with a WGS catalyst that fills tubes 244 and/or has been wash-coated onto the inner portion of the walls of the tubes 244. This WGS catalyst may accelerate the reaction of the carbon monoxide in the syngas with water, (e.g. steam), in the syngas to form carbon dioxide and hydrogen. This process may be performed to adjust the ratio of hydrogen to carbon monoxide in the raw syngas from approximately 1 to 1 to approximately 2 to 1, 3 to 1, or 4 to 1.

The shifted syngas may exit the tubular WGS reactor 234, generally in the direction of arrow 250, and may enter the conduit 242. In conduit 242, the bypassed syngas may mix with the shifted syngas and the mixture may enter the heat exchanger 252. The heat exchanger 252 may cool the mixed syngas with a coolant, for example, water. Cooling of the syngas may cause the water, transmitted via conduit 254, to vaporize, creating steam. This steam, for example, may be transmitted to the steam turbine 124 via conduit 256. The conduit 252 may pass the mixed syngas to a distributor 258, which may be also operate to cool the syngas to generate condensate 260, as well as distribute the syngas mixture into tubes 262 of the $H_2S$ membrane separator 230.

The $H_2S$ membrane separator 230 may receive steam, such as low pressure steam, through conduit 264 that may pass through and exit the $H_2S$ membrane separator 230 via conduit 266. The flow that exits the $H_2S$ membrane separator 230 via conduit 266 may include both steam and $H_2S$. This is accomplished through a pressure differential between the tubes 262 of the $H_2S$ membrane separator 230 and the area 268 surrounding the tubes 262 of the $H_2S$ membrane separator 230. For example, the pressure inside of the tubes 262 may be lower than the pressure in the area 268 surrounding the tubes 262, e.g., at least a 5, 10, 15, 20, or 25 percent difference in pressure between the tubes 262 of the $H_2S$ membrane separator 230 and the area 268 surrounding the tubes 262 of the $H_2S$ membrane separator 230. Furthermore, tubes 262 may be formed with a membrane type material that allows for $H_2S$ to pass through the tubes 262, while blocking the syngas from flowing through the tubes 262. Accordingly, the pressure difference between the tubes 262 and the area 268 surrounding the tubes 262 may cause the $H_2S$ to flow from the interior of the tubes 262 into the exterior area 268 surrounding the tubes 262, such that the $H_2S$ mixes with the steam surrounding the tubes 262 of the $H_2S$ membrane separator 230. In this manner, the steam acts as a carrier for the $H_2S$, thus transporting the $H_2S$ out of the $H_2S$ membrane separator 230 via conduit 266. As illustrated in FIG. 6, the steam may be removed from the $H_2S$ in a water knockout unit 186 so that the $H_2S$ may be treated in the sulfur recovery and tail gas treating unit 116. In this manner, the $H_2S$ membrane separator 230 operates to generate clean syngas from raw syngas.

The clean syngas is transmitted to a heat exchanger 270 generally in the direction illustrated by arrow 250. This heat exchanger 270 may remove heat from the clean syngas prior to the methanation process. The heat exchanger 270 may transmit the clean syngas to a distributor 272, which may distribute the clean syngas into tubes 274 of a tubular methanation reactor 276 in the methanation reactor 232.

The inner portion of the walls of the tubes 274 of the tubular methanation reactor 276 may be wash-coated with a methanation catalyst. This methanation catalyst may accelerate the reaction of the CO and the $H_2$ in the syngas into $CH_4$ and $H_2O$, that is, into methane, (e.g., SNG), and water as a SNG rich gas. This reaction is extremely exothermic, producing approximately five times as much heat as is produced in the WGS reactor 228, on a per mol of fed carbon monoxide basis. Accordingly, water may be passed through conduit 278, generally in the direction indicated by arrow 280, to cool the tubes 274 (e.g., coolant flow around the tubes 274) so that they are not damaged during the methanation reaction. The water transmitted through the tubular methanation reactor 276 may vaporize, producing steam for transmission to the steam turbine 124 via conduit 282.

After the methanation reaction has occurred, the SNG rich gas may exit the tubular methanation reactor 276 into recycler 284. Recycler 284 may pass some portion, for example approximately 5%, 10%, 15%, 20%, 25%, 30%, 35%, 40%, 45%, 50%, 55%, 60%, 65%, 70%, 75%, 80%, 85%, or 90% by volume or between approximately 5%-90% by volume of the SNG rich gas through conduit 286 to conduit 288 via recycle compressor 290. This transfer of SNG rich gas may operate to recycle the SNG rich gas through the tubular methanation reactor 276 to control the heat generated during the methanation process. In this manner, one may control the temperature of methanation reactor 160 so it may be approximately between 650 degrees Celsius and 700 degrees Celsius. For example, if 10% of the SNG rich gas by volume is injected into the tubes 274 of the tubular methanation reactor 276, by means of conduit 272, the methanation product components present in that 10% portion SNG rich gas, that is, $CH_4$ and $H_2O$ will not react, thus becoming factors of dilution for the methanation reaction media, and thereby preventing the methanation process from overheating the methanation catalyst, the methanation reactor 276 and its tubes 274. Furthermore, recycle compressor 290 may aid in increasing the pressure of the SNG rich gas in the conduit 288 to a level approximately equal to the pressure of the syngas in the conduit 272, since the methanation catalyst may introduce a drop in pressure of the gas flowing through the tubes 274.

The remainder of the SNG rich gas may be transmitted through heat exchanger 270 via conduit 292 in a general direction illustrated by the arrow 280 to cool the SNG rich gas. The SNG rich gas may exit the heat exchanger 270 via conduit 294, e.g., to be transmitted to the $CO_2$ removal unit 184 of FIG. 6. As such, it should be noted that the WGS-methanation-membrane reactor 226 may utilize sour WGS and sweet methanation, that is, sulfur 118 has been removed from the syngas prior to it being converted into a SNG rich gas, but after WGS has been performed. This may allow for less complex purification of the syngas prior to WGS because the process may be performed with raw syngas, while allowing for use of a relatively less complex tubular methanation reactor 276 for conversion of the syngas into SNG because the methanation processes may be performed with clean syngas.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a substitute natural gas (SNG) production system, comprising:
        a multi-stage reactor, comprising:
            a water gas shift (WGS) reactor comprising a first tubing having a WGS catalyst to adjust a ratio of hydrogen to carbon monoxide in a fluid passing through the WGS reactor;
            a methanation reactor comprising a second tubing having a hydrodesulfurization (HDS) catalyst and a methanation catalyst to accelerate a reaction of the hydrogen and the carbon monoxide in the fluid;
            a gas flow path configured to flow the fluid through both the WGS reactor and the methanation reactor; and
            a single unit having both the WGS reactor and the methanation reactor.

2. The system of claim 1, wherein the single unit comprises an acid gas removal system in the gas flow path between the WGS reactor and the methanation reactor.

3. The system of claim 1, wherein the single unit excludes an acid gas removal system in the gas flow path between the WGS reactor and the methanation reactor.

4. The system of claim 3, comprising the acid gas removal system downstream of the gas flow path of the multi-stage reactor.

5. The system of claim 3, comprising the acid gas removal system upstream of the gas flow path of the multi-stage reactor.

6. The system of claim 1, wherein the single unit excludes a carbon dioxide removal system in the gas flow path between the WGS reactor and the methanation reactor.

7. The system of claim 6, comprising the carbon dioxide removal system downstream of the gas flow path of the multi-stage reactor.

8. The system of claim 1, comprising a heat exchanger disposed in the gas flow path between the WGS reactor and the methanation reactor in the single unit, wherein the heat exchanger is configured generate steam while cooling gas flow through the multi-stage reactor.

9. The system of claim 1, comprising a heat exchanger in the single unit to generate steam while cooling a gas flow through the gas flow path of the multi-stage reactor, and a steam turbine at least partially driven by the steam.

10. A system, comprising:
    a multi-stage reactor, comprising:
        a water gas shift (WGS) reactor;
        an acid gas removal (AGR) system configured to remove hydrogen sulfide from syngas after a WGS reaction in the WGS reactor;
        a sweet methanation reactor configured to generate methane from the syngas after removal of acid gas by the AGR system; and
        a single unit having the WGS reactor, the AGR system, and the methanation reactor.

11. The system of claim 10, wherein the AGR system comprises membrane tubes configured to pass hydrogen sulfide through the membrane tubes while blocking syngas from passing through the membrane tubes.

12. The system of claim 10, wherein the WGS reactor comprises catalyst wash-coated tubes configured to cause a chemical reaction with syngas flowing through the catalyst wash-coated tubes to generate carbon dioxide and hydrogen by CO reaction with steam.

13. The system of claim 10, wherein the sweet methanation reactor comprises catalyst wash-coated tubes configured to cause a chemical reaction with syngas flowing through the catalyst wash-coated tubes to generate substitute natural gas.

14. The system of claim 13, wherein the sweet methanation reactor comprises a heat exchanger configured to generate steam while cooling the catalyst wash-coated tubes, and a steam turbine at least partially driven by the steam.

15. A system, comprising:
    a water gas shift (WGS) reactor comprising first tubing having a WGS catalyst;
    a sour methanation reactor comprising second tubing having a hydrodesulfurization (HDS) catalyst and a methanation catalyst; and
    a single unit having both the WGS reactor and the methanation reactor.

16. The system of claim 15, comprising an acid gas removal system downstream of the single unit.

17. The system of claim 15, wherein the first tubing comprises catalyst wash-coated tubes configured to cause a chemical reaction with syngas flowing through the catalyst wash-coated tubes to generate carbon dioxide and hydrogen.

18. The system of claim 15, wherein the second tubing comprises catalyst wash-coated tubes configured to cause a chemical reaction with syngas flowing through the catalyst wash-coated tubes to generate substitute natural gas.

19. The system of claim 18, wherein the sour methanation reactor comprises a heat exchanger configured to generate steam via cooling the second tubing.

20. The system of claim 15, comprising a substitute natural gas recycling unit configured to transmit substitute natural gas from downstream of the sour methanation reactor to upstream of the sour methanation reactor as an input to the sour methanation reactor.

* * * * *